Sept. 15, 1953
G. L. KAMPA
2,652,221
REARVIEW MIRROR MOUNTING
Filed May 3, 1951
2 Sheets-Sheet 1
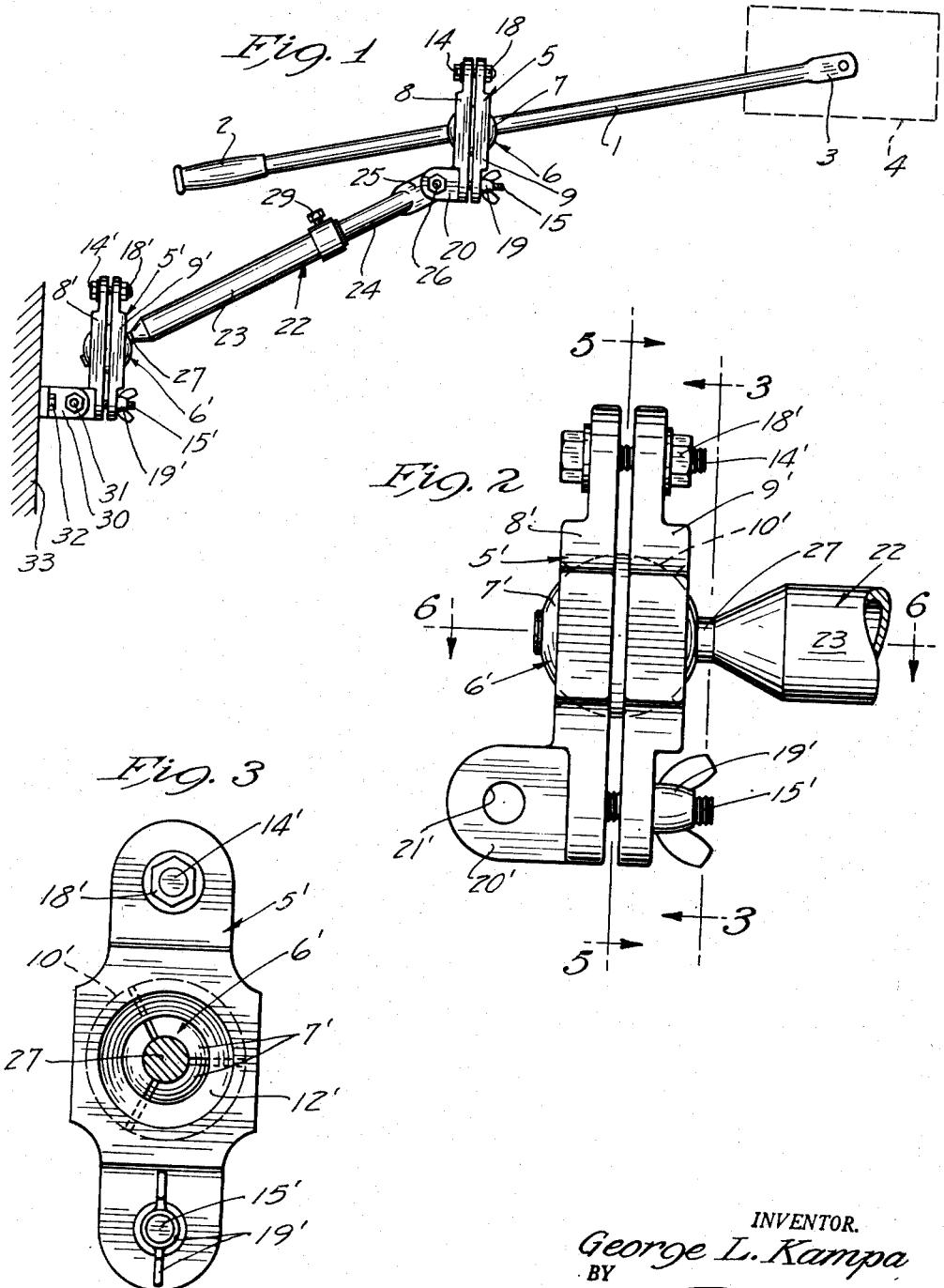
INVENTOR.
George L. Kampa
BY
Merchant & Merchant
ATTORNEYS Sept. 15, 1953
G. L. KAMPA
2,652,221
REARVIEW MIRROR MOUNTING
Filed May 3, 1951
2 Sheets-Sheet 2
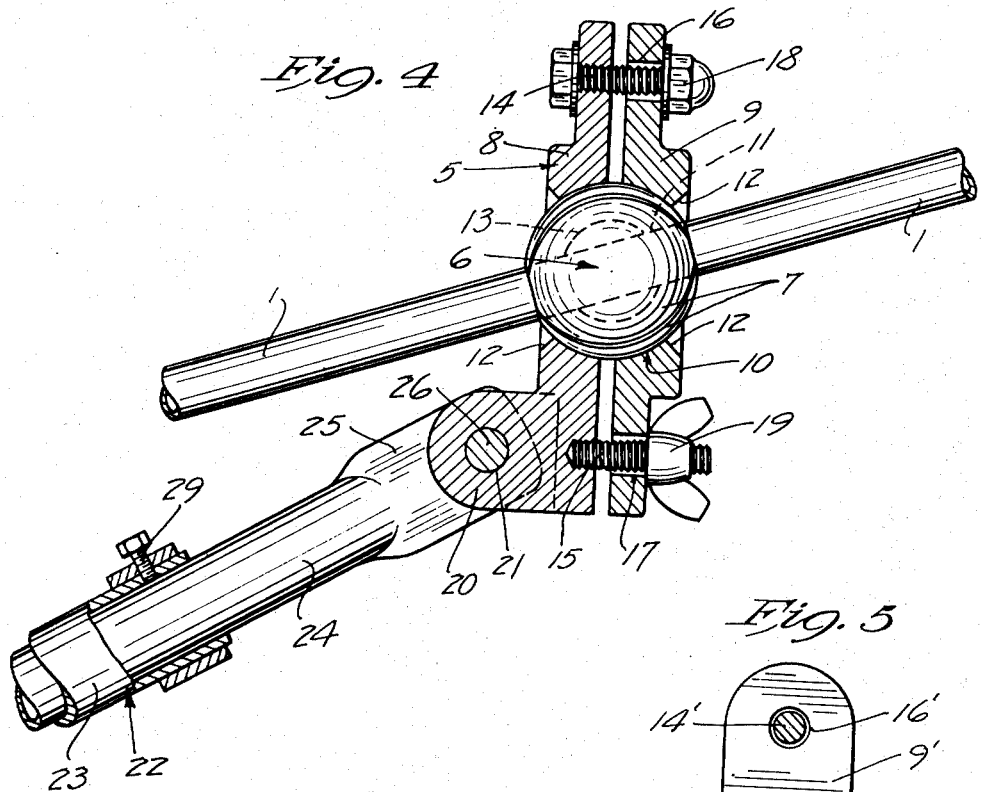
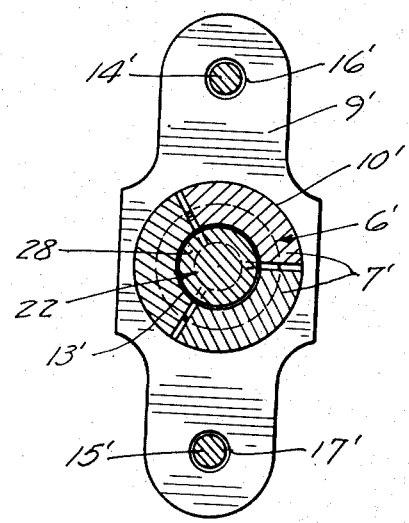
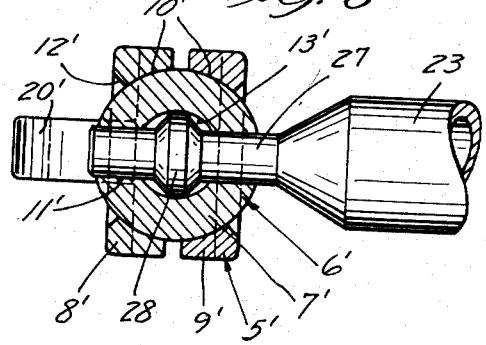
INVENTOR.
George L. Kampa
BY
Merchant & Merchant
ATTORNEYS Patented Sept. 15, 1953

2,652,221

UNITED STATES PATENT OFFICE 2,652,221

REARVIEW MIRROR MOUNTING

George L. Kampa, Minneapolis, Minn., assignor to Kampa Company, Inc., Minneapolis, Minn., a corporation of Minnesota Application May 3, 1951, Serial No. 224,297

1 Claim. (Cl. 248—278)

My invention relates to mounting devices particularly adapted for use in mounting and supporting rear view mirrors and the like on vehicles.

More particularly, the invention relates to means for mounting rear view mirrors on busses or trucks, wherein the load-carrying rear portion of the vehicle is of considerably greater width than the cab portion normally occupied by the driver.

An important object of my invention is the provision of mounting means for rear view mirrors and the like which will permit the mirror to be moved laterally outwardly of the cab portion of the vehicle so that the driver thereof may have a clear and unobstructed view to the rear, wherein the mirror may be quickly and easily moved laterally inwardly toward the cab when the vehicle approaches a laterally confined space such as a narrow driveway or the like.

Another important object of my invention is the provision of a rear view mirror mounting which may be readily adjusted to compensate for differing eye levels of vehicle operators.

Still another object of my invention is the provision of means for quickly and easily locking the mounting means so that adjustment of the rear view mirror is maintained irrespective of the amount of vibration of the vehicle when in motion.

Another object of my invention is the provision of means whereby theft of the rear view mirror from the vehicle is rendered difficult without the use of tools for removal of the same.

A still further object of my invention is the provision of a rear view mirror supporting device which is relatively simple and inexpensive to produce, which is efficient in operation, and which is rugged in construction and durable in use.

The above and still further highly important objects and advantages of my invention will become apparent from the following detailed specification, appended claim, and attached drawings.

Referring to the drawings, which illustrate the invention, and in which like characters indicate like parts throughout the several views:

Fig. 1 is a view in front elevation of a preferred form of mounting means for a rear view mirror, built in accordance with my invention;

Fig. 2 is a fragmentary view in front elevation of a portion of the structure of Fig. 1, illustrating a bracket of my invention on an enlarged scale;

Fig. 3 is a view partly in side elevation and partly in section, taken on the line 3—3 of Fig. 2;

Fig. 4 is an enlarged fragmentary detail in front elevation and partly in vertical section of the rear view mirror carrying arm and bracket therefor, and supporting means for the bracket;

Fig. 5 is a vertical section, taken on the line 5—5 of Fig. 2;

Fig. 6 is a view partly in plan and partly in horizontal section, taken on the line 6—6 of Fig. 2.

In the preferred embodiment of the invention illustrated in Figs. 1 to 6 inclusive, the numeral 1 indicates an elongated cross-sectionally circular arm having at one end a handle member 2 and being flattened at its other end, as indicated at 3, where it is adapted to be secured by suitable means to a conventional rear view mirror, shown in Fig. 1 by dotted lines and indicated at 4. The arm 1 is mounted in a bracket 5 comprising a ball 6 made up of a plurality, as shown 3, of sections 7 that are spherically segmental in shape, and a pair of cooperating clamping plates 8 and 9. Each of the plates 8 and 9 are provided with central apertures which extend therethrough and which cooperate to define a spherical recess 10 in which the ball 6 is contained. The segmental sections 7 are formed to provide an axial passage 11 through which the arm 1 extends. It should be noted that the ball 6 is divided into its component sections 7 in planes extending parallel to the axis of the arm 1. With reference to Fig. 4, it will be observed that the apertures which form the spherical recess 10 are beveled or countersunk from the opposed outer sides of the plates 8 and 9, as indicated at 12, for a purpose which will hereinafter become apparent. The passage 11 through the ball 6 is diametrically enlarged centrally of the ball to provide a chamber 13.

A pair of clamping screws or studs 14 and 15 have screw-threaded engagement with the clamping plate 8 and extend outwardly therefrom in the direction of the cooperating clamping plate 9. As shown, the studs 14 and 15 are located laterally outwardly of diametrically opposed side portions of the ball 6 adjacent the opposite ends of the plate 8. The cooperating clamping plate 9 is provided with apertures 16 and 17 for the reception of the studs 14 and 15 respectively. A washer-equipped acorn nut 18 is screw-threaded on the stud 14 and a wing nut 19 is screw-threaded on the stud 15, said nuts, when tightened on their respective studs, causing the ball sections 7 to be moved into tight clamping engagement with the arm 1 and to be frictionally locked against movement in the spherical recess 10. The length of the stud 14 is such that when the nut 18 is screw-threaded tightly thereon, the clamping plates 8 and 9 will be in spaced-apart relationship, as shown in Fig. 4, to an extent that loosening or tightening of the wing nut 19 will be sufficient to release or lock the ball 6 and the arm 1. Loosening of the wing nut 19 will permit rotary and axial sliding movements of the arm 1 with respect to the ball 6 and universal swinging movements of the arm 1 and ball 6 with respect to the bracket 5 to an extent permitted by the countersunk or beveled portions 12 of the plates 8 and 9. The radius of the recess 10 corresponds to the radius of the outer surfaces of the ball sections 7, and the radius of the portions of the segments 7 which define the passage 11 corresponds to the radius of the arm 1 whereby to insure an even clamping pressure between the plates 8 and 9 and the sections 7 and between said sections 7 and the mirror-supporting arm 1. The clamping pressure exerted by the ball sections 7 against the arm 1 is enhanced by the enlarged central chamber 13 in that each segment exerts pressure on the arm 1 at axially spaced relatively small areas thereon.

The clamping plate 8 is provided at its lower end portion with a laterally outwardly projecting mounting flange 20 through which extends an opening 21. An extendable and retractable member 22 comprises a pair of telescoping tubular rods 23 and 24, the latter of which is flattened at its outer end, as indicated at 25. A nut-equipped screw 26 extends through a suitable aperture in the flattened end portion 25 of the rod 24 and through the aperture 21 in the mounting flange 20 to lock the clamping plate 8 in any desired angular relationship with respect to the rod 24. At the opposite end of the member 22, the tubular rod 23 is formed to provide a reduced shaft portion 27 which is adapted to be contained in and supported by a bracket 5' identical in all respects to the bracket 5 and the component parts of which are identified by numerals corresponding to those associated with the bracket 5 but having prime marks added. The shaft portion 27, for the greater part of its length, is of the same diameter as the mirror-carrying arm 1. However, intermediate its ends, the shaft portion 27 is formed to provide a collar element 28 which is contained within the chamber 13' of the ball 6'. The collar 28 limits axial sliding movements of the shaft 27 with respect to the ball 6' when the wing nut 19' is loosened on the stud 15' so as to prevent or at least deter theft of the supporting element 22 and the parts carried thereby including the mirror 4. With particular reference to Figs. 1 and 4, it will be seen that the rod 24 is locked in a desired set extended or retracted position with respect to its cooperating rod 23 by a set screw or the like 29.

With reference to Fig. 1, it will be seen that an angle bracket or the like 30 is rigidly secured, by means of a nut-equipped bolt 31, to the anchoring flange 20' of the bracket 5'. As shown, the mounting bracket 30 is also rigidly secured, by means of bolts or the like 32, to a suitable base of support 33 which may be assumed to comprise a portion of the cab of a bus or truck in close relationship to the operator thereof.

From the above, it should be obvious that removal of the entire mirror mounting structure may be effected only by the use of tools such as wrenches, pliers, or the like inasmuch as the handle 2 prevents the arm 1 from being removed from the bracket 5 and the collar 28 on the shaft portion 27 prevents removal of the extendable and retractable supporting member 22 from the bracket 5' when the wing nuts 19 and 19' are loosened. It should be further obvious that by loosening the wing nuts 19 and 19', the nut-equipped screws 26 and 31, and the set screw 29, the mirror 4 may be moved in any desired direction and positioned to give the driver of the vehicle a clear view to the rear thereof without necessitating removal of his line of vision from the front to an excessive degree. When it is desired to drive the vehicle into a restricted alley or driveway where lateral clearance is at a minimum, the mirror may be quickly and easily moved laterally inwardly so as to obviate possible injury thereto.

My invention has been thoroughly tested and found to be completely satisfactory for the accomplishment of the objectives set forth; and, while I have shown and described a preferred embodiment and a single modification of my novel rear view mirror mounting, it will be understood that the same is capable of modification without departure from the spirit and scope of the invention as defined in the claim.

What I claim is:

A mounting device for rear view mirrors; said device comprising an arm adapted to be secured to a rear view mirror; a bracket mounting said arm for longitudinal sliding and universal swinging and pivotal movements with respect thereto; said bracket comprising a ball made in segmental sections, said sections defining an axial passage through which said arm extends, a pair of spaced clamping plates defining a spherical recess containing said ball, and means including a clamping screw connecting said plates laterally outwardly of the ball and a clamping nut threaded on said screw; an extensible and retractable rod comprising a pair of telescoping rod sections; means pivotally mounting one of said rod sections to one of the plates of said bracket; a second bracket identical to said first-mentioned bracket and comprising a ball made in segmental sections, a pair of cooperating clamping plates and a nut-equipped clamping screw; the other of said rod sections extending through the axial passage in the ball of said second bracket; anchoring means pivotally mounting one of the plates of said second bracket to a base of support, the passage through said last-mentioned ball being diametrically enlarged centrally, and a collar element on said other rod within said enlarged portion of the passage, said collar element being of greater diameter than the normal passage whereby to limit axial movement of said other rod with respect to said ball.

GEORGE L. KAMPA.

References Cited in the file of this patent
UNITED STATES PATENTS

| Number | Name | Date |
|---|---|---|
| 259,957 | White | June 20, 1882 |
| 310,870 | Blessing | Jan. 20, 1885 |
| 470,668 | Fisher | Mar. 15, 1892 |
| 1,218,631 | De Monts | Mar. 13, 1917 |
| 1,822,479 | Edelmann | Sept. 8, 1931 |